United States Patent [19]

Tamura

[11] 4,342,381
[45] Aug. 3, 1982

[54] DISC BRAKE
[75] Inventor: Koichi Tamura, Tokyo, Japan
[73] Assignee: Tokico Ltd., Japan
[21] Appl. No.: 113,269
[22] Filed: Jan. 18, 1980
[30] Foreign Application Priority Data
  Jan. 19, 1979 [JP] Japan ............................... 54-5684[U]
[51] Int. Cl.³ ............................................. F16D 65/02
[52] U.S. Cl. ................................................. 188/73.38
[58] Field of Search ................... 188/73.3, 73.5, 73.6, 188/205 A, 73.36, 73.37, 73.38

[56] References Cited

U.S. PATENT DOCUMENTS 3,298,469  1/1967  Robinette ....................... 188/73.5 X
3,783,980  1/1974  Kallmeyer ........................... 188/73.5
3,841,444  10/1974  Baum et al. ..................... 188/73.5 X

FOREIGN PATENT DOCUMENTS 2114812  10/1971  Fed. Rep. of Germany ..... 188/73.5
1545644  5/1975  United Kingdom .

Primary Examiner—Duane A. Reger
Attorney, Agent, or Firm—Wenderoth, Lind & Ponack

[57] ABSTRACT

A disc brake including a friction pad supported on a stationary member and being slidable in the direction of the axis of a rotatable disc, and a pad spring acting on the friction pad to bias it against the stationary member. A retaining portion is formed integrally on the pad spring to restrict the displacement of the friction pad in the direction separating from the disc.

3 Claims, 5 Drawing Figures

DISC BRAKE

BACKGROUND OF THE INVENTION

This invention relates to a disc brake and, particularly, to a disc brake wherein a friction pad of the disc brake is prevented from falling off by utilizing a pad spring.

In conventional floating caliper type disc brakes wherein a caliper is supported on a stationary supporting member secured to a non-rotatable part of a vehicle so as to displace in the direction of the axis of a rotatable disc, one of a pair of friction pads which is located on the side of a hydraulic cylinder piston device is usually supported on a pair of guide portions provided on the stationary member and displaces thereon in the direction of the axis of the disc in applying the brake.

The friction pad on the side of the hydraulic cylinder piston device will not fall off the stationary member under the usual working condition wherein a small clearance smaller than the thickness of the friction pad is maintained between the friction pad and the disc, however, when the disc brake itself is dismounted from the vehicle or when the disc brake is handled to mount or dismount the caliper on or from the disc brake, the friction pad will sometimes fall off the stationary member.

It has been proposed to extend the guide portion of the stationary member toward the cylinder piston device when the stationary member is formed of a casting or to increase the thickness of the stationary member when the stationary member is formed of a plate member, however, these countermeasures are not very effective in preventing the friction pad from falling off.

BRIEF SUMMARY OF THE INVENTION

An object of the present invention is to overcome the shortcomings aforementioned with a simple construction and, according to the invention, there provided a disc brake wherein a pad spring is provided to bias the friction pad toward the guide portion of the stationary member, and a retaining portion is formed integrally with the pad spring to restrict the displacement of the friction pad in the direction of the axis of the disc.

BRIEF DESCRIPTION OF THE DRAWINGS

The present invention will further be explained with reference to the drawings illustrating some preferred embodiments, in which.

DESCRIPTION OF THE EMBODIMENTS

Figure 1:
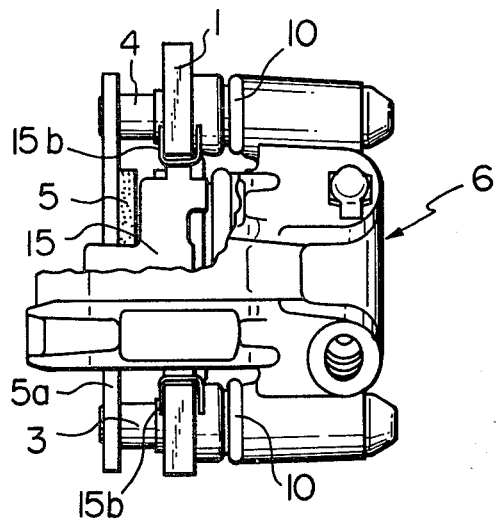
FIG. 1 is a partially broken plan view of a disc brake according to the invention.

In the embodiment of the present invention illustrated in FIGS. 1-4, the disc brake comprises a stationary member or a mounting bracket 1 formed of a plate-like material by means of press work, and the mounting bracket 1 is secured to a non-rotatable part of a vehicle such as a motor cycle or the like on one side of a rotatable disc 2. A pair of pins 3 and 4 spaced in the direction of the circumference of the disc is secured to the mounting bracket 1 by means of such as force fitting, welding or the like, and the pins 3 and 4 project respectively in the direction of the axis of the disc 2 and from the opposite sides of the mounting bracket 1. A friction pad 5 is slidably supported on the pins 3 and 4 at one side of the mounting bracket 1, and a caliper 6 is slidably supported on the pins 3 and 4 at the other side of the mounting bracket 1, so that the friction pad 5 and the caliper 6 are displaceable in the direction of the axis of the disc.

A cylinder 7 is provided in one limb portion 6a of the caliper 6 to open toward the disc 2, and a piston 9 is disposed sealingly and slidably in the cylinder 7 to press another friction pad 8 against the disc 2.

Figure 2:
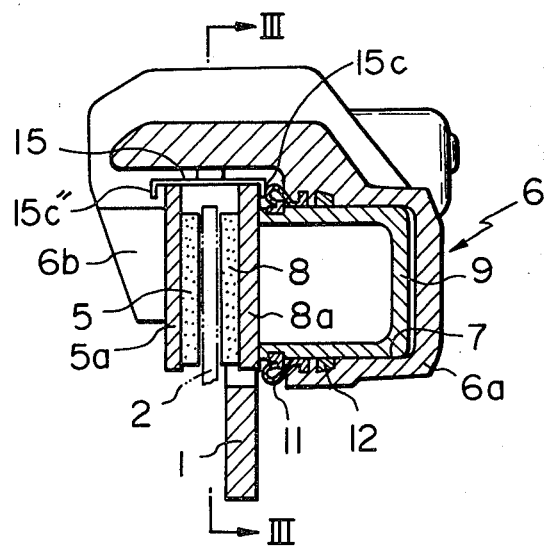
FIG. 2 is a longitudinal sectional view of the disc brake of FIG. 1.

The caliper 6 straddles a portion of the circumference of the disc 2, and another limb portion 6b thereof extends to the rear side of the friction pad 5 to apply the friction pad 5 against the disc 2. Shown at 10 in FIG. 2 are pin boots, at 11 in FIG. 3 is a boot preventing the ingress of dust, water or the like between the piston 9 and the cylinder 7, and at 12 in FIG. 3 is a seal member maintaining the sealingness between the piston 9 and the cylinder 7 and assisting the retraction of the piston 9 in releasing the hydraulic pressure in the cylinder 7.

Figure 3:
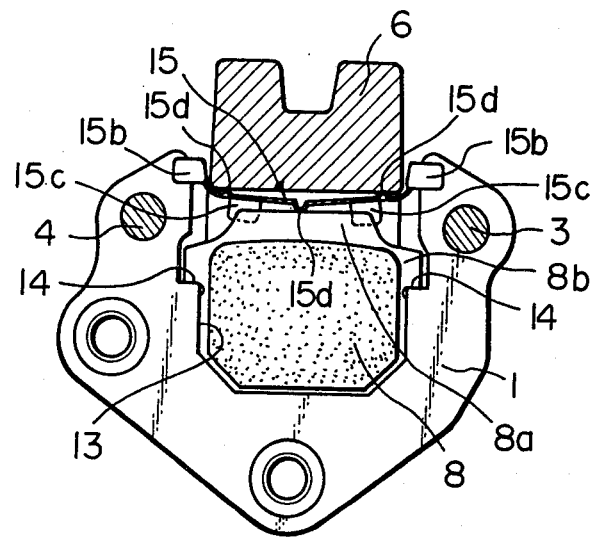
FIG. 3 is a sectional view taken along line III—III in FIG. 2.

A recess 13 is, as clearly shown in FIG. 3, formed in the mounting bracket 1 to receive therein the friction pad 8 of the side of the hydraulic cylinder piston device 7 and 9. A pair of guide portions 14 is formed on the upper portion of the recess 13, and lug portions 8b formed on opposite sides of backing plate 8a of the friction pad 8 in the direction of the circumference of the disc 2 are respectively supported slidably on the guide portions 14 of the mounting bracket 1.

Figure 4:
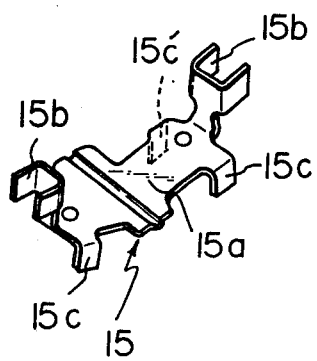
FIG. 4 is a perspective view of the pad spring used in the disc brake of FIG. 1.

According to the invention, a pad spring 15 suppressing the vibration of the friction pads 5 and 8 acts also to prevent the friction pad 8 of the side of the piston from falling off. As shown in FIG. 4, the pad spring 15 comprises a generally arcuate main body portion 15a, a pair of channel like shaped supporting portions 15b and 15b extending vertically from the opposite sides of the main body portion 15a, and retaining portions 15c and 15c provided on the edge portion on the side of the piston for engaging with the friction pad 8 thereby preventing the friction pad 8 from falling off. In the embodiment, the supporting portions 15b and 15b engage fittingly with the opposite sides of the mounting bracket 1 so as to locate the pad spring 15 with respect to the mounting bracket 1 in the direction of the axis of the disc. The pad spring 15 acts between the friction pads 5 and 8 and the caliper 6 to bias the friction pads in radially inward direction with respect to the disc so that the clearance between the guide portions 14 and the friction pad 8 is absorbed and the friction pad 5 is pressed in the radially inward direction on the pins 3 and 4. For the end, the pad spring 15 is formed to have a plurality of axially extending ridges or projections 15d resiliently engaging respectively with the caliper 6 and the friction pads 5 and 8. The reaction force from the caliper 6 and the friction pads 5 and 8 act on the pad spring 15, whereby the displacement of the pad spring 15 in the direction of the axis of the disc is controlled. In the embodiment, two circumferentially spaced retaining portions 15c are provided to restrict the displacement of the friction pad 8 in the direction separating from the disc, however, the configuration and the location of the retaining portion may be determined as desired. Further, it is possible to provide another retaining portion 15c' to restrict the displacement of the friction pad 8 in the direction approaching the disc.

Figure 5:
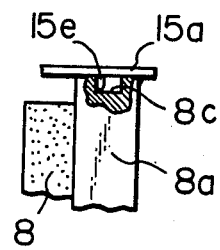
FIG. 5 is a partial view showing the essential portion of another embodiment of the present invention.

In another embodiment illustrated in FIG. 5, a retaining portion 15e projects in the radially inward direction from the main body portion 15a, and is received in a recess 8c formed in the backing plate 8a of the friction pad 8.

The retaining portion 15c is adapted to engage with the rear surface of the backing plate 8a of the friction pad 8 when the friction pad 8 moves in the direction separating from the disc by a predetermined amount, thereby preventing the friction pad 8 from moving out of the supporting portions 14, thus, the friction pad 8 will not escape through the space between the piston 9 and the mounting bracket 1 even when the disc brake is dismounted from the vehicle. Another retaining portion 15c″ may, as shown in broken lines in FIG. 2, be provided on the edge portion of the pad spring 15 at the side of the limb portion 6b of the caliper 6, whereby the single pad spring 15 can act to prevent both friction pads 5 and 8 from falling off.

As described heretofore in detail, the pad spring according to the invention can effectively prevent both friction pads from vibrations, and also prevent the friction pad of the side of the piston from falling off even if the thickness of the mounting bracket is decreased, whereby the reliability of the disc brake can be increased.

I claim:

1. A disc brake comprising:
   a stationary member including a guide portion, adapted to be secured to a non-rotatable part of a vehicle.
   a caliper mounted on the stationary member displaceably in the direction of the rotational axis of a rotatable disc,
   a pair of friction pads disposed on the opposite sides of the disc, at least one of which being supported on the guide portion of the stationary member to slide in the direction of the rotational axis of the disc, and
   a pad spring acting between the caliper and said at least one friction pad to bias the friction pad toward the guide portion of the stationary member,
   wherein said pad spring is formed of sheet metal and comprises two generally channel shaped supporting portions which are spaced in the direction of the circumference of the disc and which respectively receive axially opposite outer surfaces of the stationary member within said channel shaped portion to prevent the displacement of the pad spring in the direction of the rotational axis of the disc, and a retaining portion extending radially inwardly in the direction of the circumference of the disc,
   said retaining portion being engaged with said at least one friction pad when the sliding movement of said friction pad in the direction of the axis of the disc exceeds a predetermined amount.

2. A disc brake as set forth in claim 1, wherein the retaining portion of the pad spring engages with said at least one friction pad when the movement of the friction pad in the direction of separation from the disc exceeds a predetermined amount.

3. A disc brake as set forth in claim 1, wherein the pad spring comprises a main body portion acting between the caliper and the friction pad, said two channel shaped supporting portions are disposed on the opposite sides of the main body portion in the direction of the circumference of the disc, and said at least one retaining portion being disposed on an edge of the main body portion in the direction of the axis of the disc.

* * * * *